(12) United States Patent
Kasono et al.

(10) Patent No.: US 12,468,014 B2
(45) Date of Patent: Nov. 11, 2025

(54) SENSOR DEVICE

(71) Applicants: PIONEER CORPORATION, Tokyo (JP); PIONEER SMART SENSING INNOVATIONS CORPORATION, Tokyo (JP)

(72) Inventors: Osamu Kasono, Kawagoe (JP); Ryo Izuta, Kawagoe (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 536 days.

(21) Appl. No.: 17/915,452

(22) PCT Filed: Feb. 1, 2021

(86) PCT No.: PCT/JP2021/003474
§ 371 (c)(1),
(2) Date: Sep. 28, 2022

(87) PCT Pub. No.: WO2021/199646
PCT Pub. Date: Oct. 7, 2021

(65) Prior Publication Data
US 2023/0131002 A1 Apr. 27, 2023

(30) Foreign Application Priority Data
Mar. 31, 2020 (JP) .................. 2020-062799

(51) Int. Cl.
*G02B 26/08* (2006.01)
*G01S 7/481* (2006.01)
(Continued)

(52) U.S. Cl.
CPC .............. *G01S 7/481* (2013.01); *G01S 7/497* (2013.01); *G02B 26/0816* (2013.01);
(Continued)

(58) Field of Classification Search
CPC .......... G01S 7/481; G01S 7/497; G01S 17/02; G01S 7/4813; G01S 17/42; G01S 7/4817;
(Continued)

(56) References Cited

U.S. PATENT DOCUMENTS 9,829,579 B2  11/2017  Setono et al.
9,958,546 B2   5/2018  Setono et al.
(Continued)

FOREIGN PATENT DOCUMENTS

JP   2011-227379 A   11/2011
JP   2012-093256 A    5/2012
(Continued)

OTHER PUBLICATIONS

Extended European Search Report received in EP21779592.1, dated Mar. 21, 2024, in 9 pages.
(Continued)

*Primary Examiner* — Euncha P Cherry
(74) *Attorney, Agent, or Firm* — Procopio, Cory, Hargreaves & Savitch LLP

(57) ABSTRACT

Some of electromagnetic waves being emitted from an emission unit (110) and being reflected by a movable reflection unit (120) are reflected or scattered by a target object such as an object existing outside as a sensor device (10). Some other of the electromagnetic waves being emitted by the emission unit (110) and being reflected by the movable reflection unit (120) are reflected or scattered by a structure (200) positioned closer to the movable reflection unit (120) than the target object is. A detection unit (122) detects deflection angles of the movable reflection unit (120) in a first direction (X) and a second direction (Y). An amendment unit (150) amends a detection result by the detection unit (122), based on a receiving result of the electromagnetic waves by a receiving unit (130), the elec- (Continued)

tromagnetic waves being reflected or scattered by the structure (200).

8 Claims, 12 Drawing Sheets

(51) Int. Cl.
    *G01S 7/497*     (2006.01)
    *G02B 26/10*     (2006.01)
    *G01S 17/02*     (2020.01)

(52) U.S. Cl.
    CPC ............ *G02B 26/101* (2013.01); *G01S 17/02* (2013.01); *G02B 2207/117* (2013.01)

(58) Field of Classification Search
    CPC .............. G02B 26/0816; G02B 26/101; G02B 2207/117
    See application file for complete search history.

(56) References Cited

U.S. PATENT DOCUMENTS

| | | |
|---|---|---|
| 10,018,502 B2 | 7/2018 | Mushimoto et al. |
| 12,099,143 B2 | 9/2024 | Yamamoto et al. |
| 2007/0229929 A1 | 10/2007 | Soreide et al. |
| 2008/0074718 A1 | 3/2008 | Bush et al. |
| 2015/0369920 A1 | 12/2015 | Setono et al. |
| 2016/0003945 A1 | 1/2016 | Setono et al. |
| 2016/0018256 A1 | 1/2016 | Mushimoto et al. |
| 2019/0025410 A1 | 1/2019 | Hoashi |
| 2020/0033452 A1 | 1/2020 | Takagawa et al. |
| 2020/0182977 A1* | 6/2020 | Wang .................. G02B 26/105 |
| 2020/0393546 A1 | 12/2020 | Yamamoto et al. |

FOREIGN PATENT DOCUMENTS

| | | |
|---|---|---|
| JP | 2014-020963 A | 2/2014 |
| JP | 2016-006403 A | 1/2016 |
| JP | 2016-014607 A | 1/2016 |
| JP | 2016024316 A | 2/2016 |
| JP | 2020-016481 A | 1/2020 |
| WO | 2019/163526 A1 | 8/2019 |

OTHER PUBLICATIONS

International Search Report mailed on Apr. 20, 2021, from International Application No. PCT/JP2021/003474, 2 pages.

Office Action received in CN202180025522.5, dated Apr. 11, 2025, 21 pages (with translation).

Office Action received in JP2024-077811, dated Jul. 1, 2025, in 13 pages (with translation).

* cited by examiner

SENSOR DEVICE

CROSS-REFERENCE TO RELATED APPLICATIONS

This application is a U.S. National Stage entry of PCT Application No: PCT/JP2021/003474 filed Feb. 1, 2021, which claims priority to Japanese Patent Application No. 2020-062799 filed Mar. 31, 2020, the contents of which are incorporated herein by reference.

TECHNICAL FIELD

The present invention relates to a sensor device.

BACKGROUND ART

In recent years, various sensor devices such as light detection and ranging (LiDAR) have been developed. A sensor device includes a movable reflection unit such as a micro-electro-mechanical systems (MEMS) mirror. The sensor device scans a target object such as an object existing outside the sensor device by reflecting electromagnetic waves such as infrared radiation toward a predetermined scanning range by the movable reflection unit.

Patent Document 1 describes placing a reflection member at one end of a scanning range of a movable reflection unit in order to find a direction in which laser light reflected by the movable reflection unit is output. The laser light reflected by the reflection member is received by a light receiving unit. Based on the receiving result by the light receiving unit, the distance from the movable reflection unit to the reflection member is calculated. Based on the distance from the movable reflection unit to the reflection member, the direction in which the laser light reflected by the movable reflection unit is output is calculated.

Patent Document 2 describes providing a reflection member on a housing accommodating members constituting a sensor device, such as a movable reflection unit, and detecting a deviation of a scanning position of the movable reflection unit with laser light reflected by the reflection member.

RELATED DOCUMENT

Patent Document

Patent Document 1: Japanese Unexamined Patent Publication No. 2016-6403
Patent Document 2: Japanese Unexamined Patent Publication No. 2020-16481

SUMMARY OF THE INVENTION

Technical Problem

A sensor device may be provided with a detection unit for detecting a deflection angle of a movable reflection unit. However, the sensitivity of the detection unit may have temperature dependence. In this case, a detection result by the detection unit may deviate from a detection result in a design state.

Examples of a problem to be solved by the present invention include amending a deviation of a detection result of a deflection angle of a movable reflection unit by a detection unit from a detection result in a design state.

Solution to Problem

The invention according to claim 1 is a sensor device including:
a movable reflection unit reflecting an electromagnetic wave toward inside a predetermined scanning range;
a detection unit detecting a deflection angle of the movable reflection unit;
a receiving unit receiving the electromagnetic wave reflected or scattered by a structure positioned in the scanning range; and
an amendment unit amending a detection result by the detection unit, based on a receiving result of the electromagnetic wave by the receiving unit, the electromagnetic wave being reflected by the structure.

DESCRIPTION OF EMBODIMENTS

An embodiment of the present invention will be described below by using drawings. Note that, in every drawing, similar components are given similar signs, and description thereof is omitted as appropriate.

Figure 1:
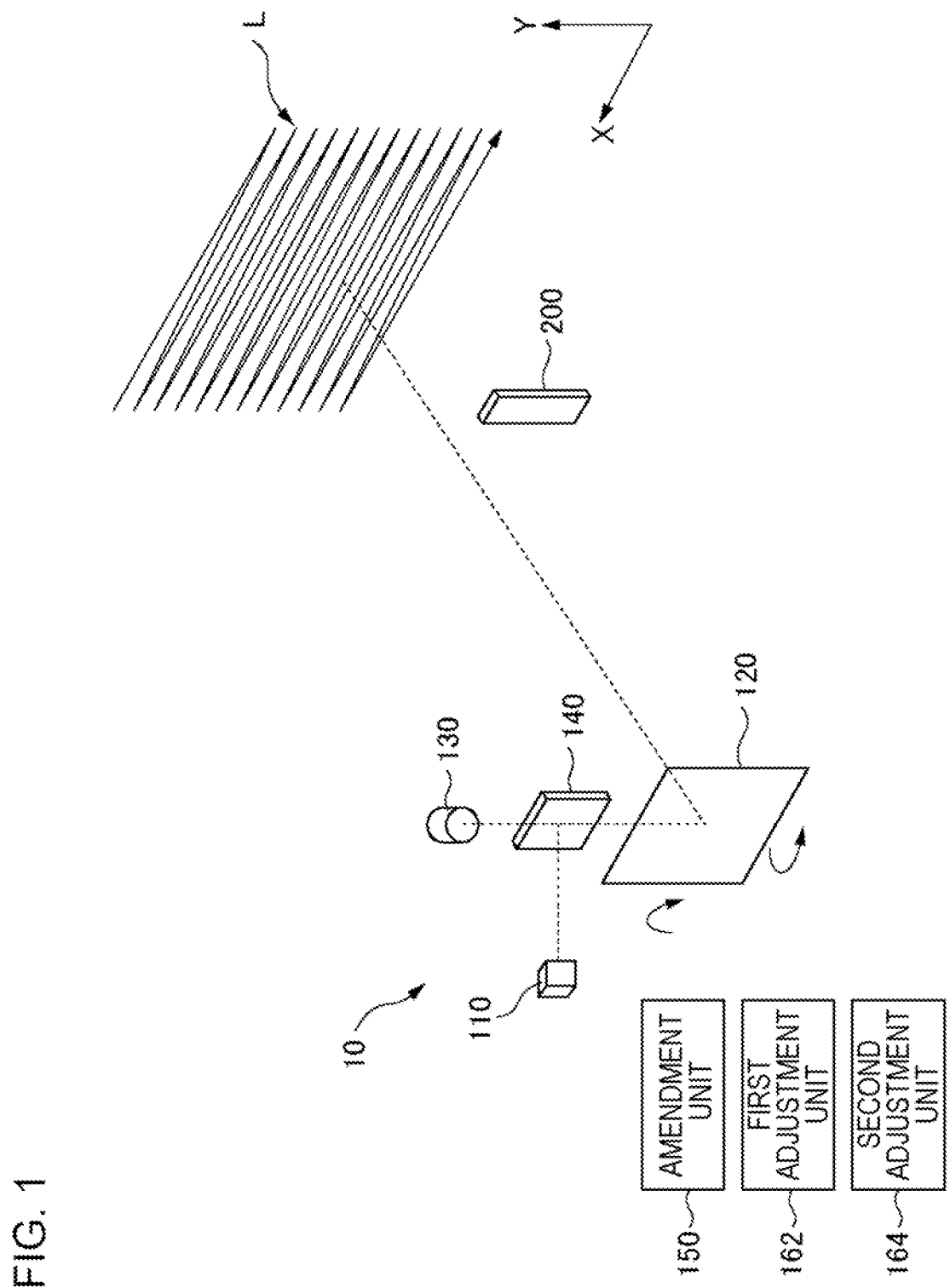
FIG. 1 is a diagram illustrating a sensor device according to an embodiment.

FIG. 1 is a diagram illustrating a sensor device 10 according to the embodiment.

In FIG. 1, a first direction X and a second direction Y intersect each other and specifically are orthogonal to each other. In FIG. 1, the first direction X is a horizontal direction. A positive direction of the first direction X being a direction of an arrow indicating the first direction X is leftward viewed from a movable reflection unit 120 to be described later toward a scanning range, to be described later, of the movable reflection unit 120. A negative direction of the first direction X being a direction opposite to the direction of the arrow indicating the first direction X is rightward viewed from a side on which the movable reflection unit 120 is positioned toward the scanning range of the movable reflection unit 120. The second direction Y is a vertical direction. A positive direction of the second direction Y being a direction of an arrow indicating the second direction Y is upward. A negative direction of the second direction Y being a direction opposite to the direction of the arrow indicating the second direction Y is downward.

As is obvious from the description herein, the first direction X may be a direction different from the horizontal direction, and the second direction Y may be a direction different from the vertical direction.

The sensor device 10 includes an emission unit 110, the movable reflection unit 120, a detection unit 122, a receiving unit 130, a beam splitter 140, an amendment unit 150, a first adjustment unit 162, and a second adjustment unit 164. In FIG. 1, a dotted line extending over the emission unit 110, the movable reflection unit 120, the receiving unit 130, the beam splitter 140, and a scanning line L indicates electromagnetic waves propagating over the emission unit 110, the movable reflection unit 120, the receiving unit 130, the beam splitter 140, and the scanning line L. In FIG. 1, the electromagnetic waves reflected from the movable reflection unit 120 toward the scanning line L are projected toward a roughly central part of a region where the scanning line L is formed.

The emission unit 110 emits electromagnetic waves such as pulse-shaped infrared radiation a certain time intervals. For example, the emission unit 110 is an element, such as a laser diode (LD), that can convert electricity such as current into electromagnetic waves such as light. The electromagnetic waves emitted from the emission unit 110 are reflected by the beam splitter 140 and enters the movable reflection unit 120.

The movable reflection unit 120 reflects electromagnetic waves emitted from the emission unit 110 toward inside a predetermined scanning range. The scanning range of the movable reflection unit 120 is a range on which the electromagnetic waves reflected by the movable reflection unit 120 can be projected. For example, the movable reflection unit 120 is a biaxial MEMS mirror. For example, the movable reflection unit 120 is sinusoidally driven along the first direction X and is driven in a sawtooth wave shape along the second direction Y at a frequency lower than that of the sinusoidal wave along the first direction X. In other words, the first direction X is a resonance drive direction of the movable reflection unit 120, and the second direction Y is a linear drive direction of the movable reflection unit 120.

The detection unit 122 detects deflection angles of the movable reflection unit 120 in the first direction X and the second direction Y. For example, the detection unit 122 is a piezoresistor provided on the movable reflection unit 120. The deflection angles of the movable reflection unit 120 in the first direction X and the second direction Y are controlled based on a detection result by the detection unit 122. Accordingly, when the sensitivity of the detection unit 122 has temperature dependence, the detection result of the deflection angles of the movable reflection unit 120 by the detection unit 122 may vary according to the temperature, and as a result, the deflection angles of the movable reflection unit 120 may vary according to the temperature. As will be described later, a detection result of the deflection angles of the movable reflection unit 120 by the detection unit 122 can be amended by the amendment unit 150, according to the present embodiment.

Some of electromagnetic waves being emitted from the emission unit 110 and being reflected by the movable reflection unit 120 are reflected or scattered by a target object such as an object existing outside the sensor device 10. The electromagnetic waves return to the movable reflection unit 120, enter the receiving unit 130 after sequentially undergoing reflection by the movable reflection unit 120 and transmission by the beam splitter 140, and are received by the receiving unit 130. For example, the receiving unit 130 is an element, such as an avalanche photodiode (APD), that can convert electromagnetic waves such as light into an electric signal such as current.

Some other of the electromagnetic waves being emitted from the emission unit 110 and being reflected by the movable reflection unit 120 are reflected or scattered by a structure 200 positioned closer to the movable reflection unit 120 than the target object is. The electromagnetic waves return toward the movable reflection unit 120, enter the receiving unit 130 after sequentially undergoing reflection by the movable reflection unit 120 and transmission by the beam splitter 140, and are received by the receiving unit 130. Examples of the structure 200 to be used include metal applied with surface treatment, such as plating, with high stability over time.

The distance from the movable reflection unit 120 to the structure 200 is shorter than the distance from the movable reflection unit 120 to the target object. Accordingly, the time elapsed between emission of the electromagnetic waves from the emission unit 110 and receiving of the electromagnetic waves by the receiving unit 130 with reflection of the electromagnetic waves by the structure 200 in between is shorter than the time elapsed between emission of the electromagnetic waves from the emission unit 110 and receiving of the electromagnetic waves by the receiving unit 130 with reflection of the electromagnetic waves by the target object in between. Accordingly, based on the time difference between signals generated in the receiving unit 130, the sensor device 10 can determine whether a signal generated in the receiving unit 130 is a signal caused by the structure 200 or a signal caused by the target object.

The sensor device 10 may include the structure 200. Alternatively, the structure 200 may be provided outside the sensor device 10. When the sensor device 10 includes the structure 200, for example, the structure 200 may be provided in a window part of a housing accommodating members constituting the sensor device 10, such as the emission unit 110, the movable reflection unit 120, the receiving unit 130, and the beam splitter 140, that is, a part between the inside and the outside of the housing through which electromagnetic waves are transmitted. However, a location where the structure 200 is provided is not limited to the window part.

According to the present embodiment, the amendment unit 150, the first adjustment unit 162, and the second adjustment unit 164 represent function-based blocks rather than a hardware-based configuration. The amendment unit 150, the first adjustment unit 162, and the second adjustment unit 164 are provided by any combination of hardware and software centered on a CPU, a memory, a program loaded into the memory, a storage medium storing the program, such as a hard disk, and a network connection interface of any computer. Then, various modifications to the providing method and the device can be made.

The amendment unit 150 amends a detection result by the detection unit 122, based on a receiving result of electromagnetic waves by the receiving unit 130, the electromagnetic waves being reflected or scattered by the structure 200. Amendment by the amendment unit 150 enables amendment of a deviation of a detection result of the deflection angle of the movable reflection unit 120 by the detection unit 122 from a detection result in a design state.

Figure 2:
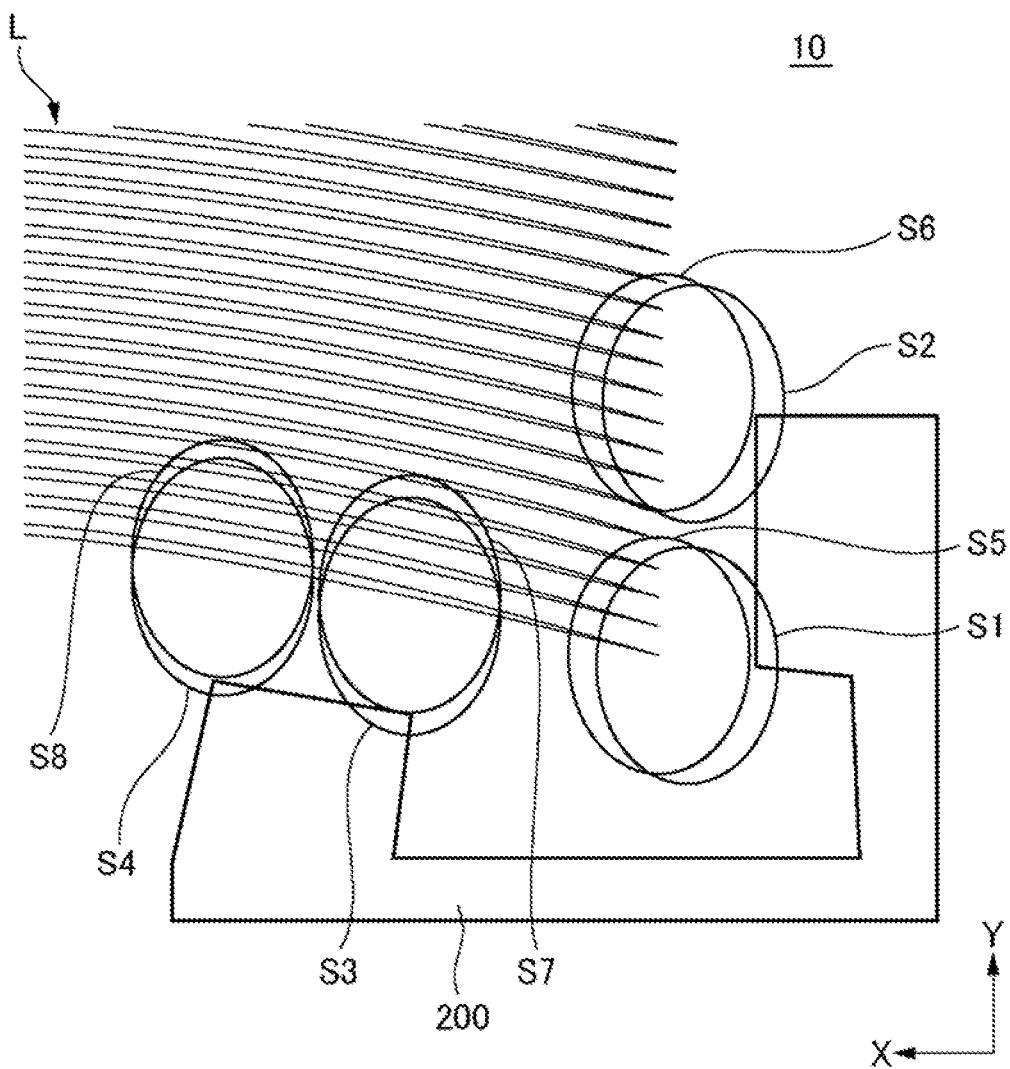
FIG. 2 is a diagram illustrating an example of a relation among a structure, a scanning line of a movable reflection unit, and spots projected on the scanning line.

FIG. 2 is a diagram illustrating an example of a relation among the structure 200, the scanning line L of the movable reflection unit 120, and spots projected on the scanning line L.

In FIG. 2, the scanning line L extends from the positive direction toward the negative direction of the second direction Y, that is, the linear drive direction of the movable reflection unit 120 while being folded back in the first direction X, that is, the resonance drive direction of the movable reflection unit 120.

FIG. 2 illustrate eight spots positioned on the scanning line L, that is, a first spot S1, a second spot S2, a third spot S3, a fourth spot S4, a fifth spot S5, a sixth spot S6, a seventh spot S7, and an eighth spot S8. Each spot is generated by electromagnetic waves being emitted from the emission unit 110 and being reflected toward the structure 200 by the movable reflection unit 120.

Each of the first spot S1, the second spot S2, the third spot S3, and the fourth spot S4 is a spot used for amendment by the amendment unit 150. At least part of the first spot S1, the second spot S2, the third spot S3, and the fourth spot S4 is projected on the structure 200. Note that the first spot S1, the second spot S2, the third spot S3, and the fourth spot S4 may be used for sensing by the sensor device 10. The first spot S1 and the second spot S2 deviate in the linear drive direction of the movable reflection unit 120, that is, the second direction Y. The second spot S2 is positioned outside the first spot S1 in the second direction Y in a region where the scanning line L is formed. The third spot S3 and the fourth spot S4 deviate in the resonance drive direction of the movable reflection unit 120, that is, the first direction X. The fourth spot S4 is positioned outside the third spot S3 in the first direction X in the region where the scanning line L is formed.

Each of the fifth spot S5, the sixth spot S6, the seventh spot S7, and the eighth spot S8 is part of spots used for sensing by the sensor device 10. No part of the fifth spot S5, the sixth spot S6, the seventh spot S7, and the eighth spot S8 is projected on the structure 200. Accordingly, energy of electromagnetic waves projected on the target object is not reduced by the structure 200 for the fifth spot S5, the sixth spot S6, the seventh spot S7, and the eighth spot S8, and sensing of the target object can be efficiently performed. The fifth spot S5 and the sixth spot S6 deviate leftward relative to the first spot S1 and the second spot S2, respectively. The seventh spot S7 and the eighth spot S8 deviate upward relative to the third spot S3 and the fourth spot S4, respectively.

The structure 200 is positioned outside the region where the scanning line L of the movable reflection unit 120 is formed. Assuming that the movable reflection unit 120 is positioned inside the region where the scanning line L is formed, the sensor device 10 may not be able to detect a target object in a region where the structure 200 is placed, or detection performance of the device may be degraded. On the other hand, in the example illustrated in FIG. 2, a region where the sensor device 10 cannot detect a target object or detection performance of the device is degraded can be limited to outside the region where the scanning line L of the movable reflection unit 120 is formed.

The amendment unit 150 may amend a detection result by the detection unit 122, based on a relation between a first receiving value of electromagnetic waves by the receiving unit 130, the electromagnetic waves being reflected or scattered by a predetermined first part of the structure 200, and a second receiving value of electromagnetic waves by the receiving unit 130, the electromagnetic waves being reflected or scattered by a predetermined second part of the structure 200. In this case, the amendment unit 150 may amend the detection result by the detection unit 122, based on a relation between a relation between the first receiving value and the second receiving value, such as at least either one of the difference and the ratio between the first receiving value and the second receiving value, and a deviation of the detection result by the detection unit 122 from a detection result in a reference state such as a design state or an initial state.

The amendment unit 150 may amend the detection result by the detection unit 122, based on a comparison result between a relation between the first receiving value and the second receiving value, and a relation between a first reference receiving value of electromagnetic waves by the receiving unit 130, the electromagnetic waves being reflected or scattered by the first part of the structure 200 when the detection unit 122 operates in the reference state, and a second reference receiving value of electromagnetic waves by the receiving unit 130, the electromagnetic waves being reflected or scattered by the second part of the structure 200 when the detection unit 122 operates in the reference state. The relation between the first reference receiving value and the second reference receiving value may be a known predetermined reference relation. For example, at least either one of the difference and the ratio between the first reference receiving value and the second reference receiving value may be a known predetermined reference value. In this case, when the sensitivity of the detection unit 122 varies from the sensitivity when the detection unit 122 is in the reference state due to a certain factor such as temperature and, as a result, the deflection angle of the movable reflection unit 120 varies from the deflection angle when the detection unit 122 is in the reference state, the relation between the first receiving value and the second receiving value varies from the predetermined reference relation. The amendment unit 150 may amend the detection result by the detection unit 122 such that the relation between the first receiving value and the second receiving value returns to the predetermined reference relation. For example, the first reference receiving value and the second reference receiving value may be substantially equal to each other.

In one example, the first part of the structure 200 may be a region on the structure 200 on which the first spot S1 is projected and the vicinity of the region, and the second part of the structure 200 may be a region on the structure 200 on which the second spot S2 is projected and the vicinity of the region. In other words, the first part and the second part of the structure 200 may deviate from each other in the linear drive direction of the movable reflection unit 120, that is, the second direction Y.

The first adjustment unit 162 can adjust the position of the structure 200 such that the relation between the first reference receiving value and the second reference receiving value is a predetermined reference relation. For example, the first adjustment unit 162 can move the structure 200 along the second direction Y. Thus, a relation between the first reference receiving value for the first spot S1 and the second reference receiving value for the second spot S2 can be the predetermined reference relation.

In another example, the first part of the structure 200 may be a region on the structure 200 on which the third spot S3 is projected and the vicinity of the region, and the second part of the structure 200 may be a region on the structure 200 on which the fourth spot S4 is projected and the vicinity of the region. In other words, the first part and the second part of the structure 200 may deviate from each other in the resonance drive direction of the movable reflection unit 120, that is, the first direction X.

The second adjustment unit 164 can adjust an emission timing of electromagnetic waves from the emission unit 110 such that the relation between the first reference receiving value and the second reference receiving value is a predetermined reference relation. Thus, a relation between the first reference receiving value for the third spot S3 and the second reference receiving value for the fourth spot S4 can be the predetermined reference relation.

Adjustment of the position of the structure 200 by the first adjustment unit 162 and adjustment of the emission timing of electromagnetic waves from the emission unit 110 by the second adjustment unit 164 may be combined as appropriate. For example, the first adjustment unit 162 may move the structure 200 in the second direction Y to amend a detection result of the deflection angle of the movable reflection unit 120 in the second direction Y by the detection unit 122, and the second adjustment unit 164 may adjust the emission unit 110 to amend a detection result of the deflection angle of the movable reflection unit 120 in the first direction X by the detection unit 122. In this case, the structure 200 may be unmovably fixed along the first direction X. Alternatively, the first adjustment unit 162 may move the structure 200 in both the first direction X and the second direction Y to amend a detection result of the deflection angle of the movable reflection unit 120 in the first direction X and second direction Y by the detection unit 122. In this case, the second adjustment unit 164 may not adjust the emission unit 110.

Figure 3:
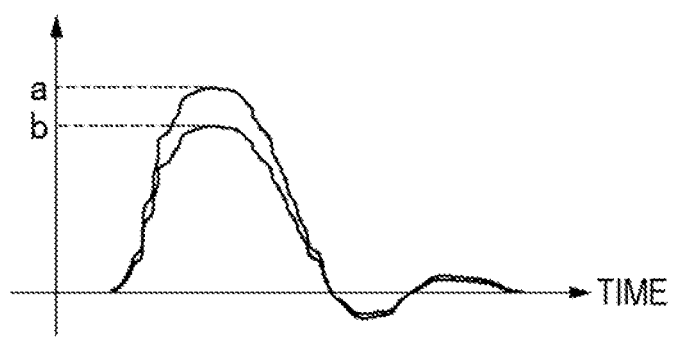
FIG. 3 is a graph illustrating an example of signals generated in a receiving unit by a first spot and a second spot that are illustrated in FIG. 2.
Figure 4:
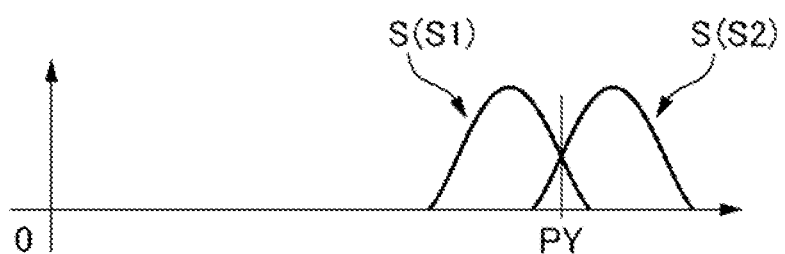
FIG. 4 is a graph illustrating an example of changes in a receiving value of the signal generated in the receiving unit by the first spot and a receiving value of the signal generated in the receiving unit by the second spot when a deflection angle of the movable reflection unit in a second direction varies.
Figure 5:
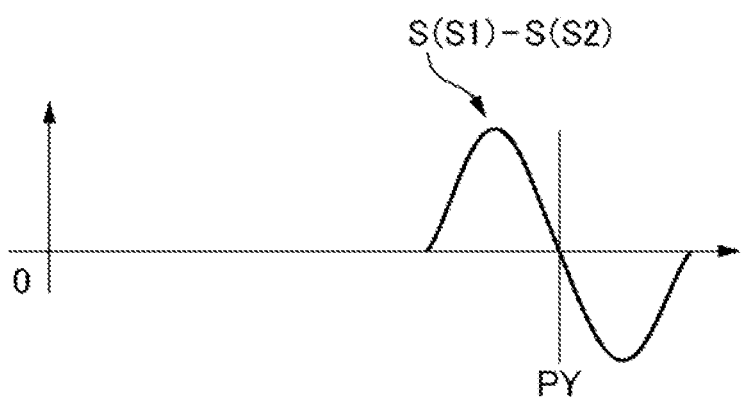
FIG. 5 is a graph illustrating the difference between the two receiving values illustrated in FIG. 4.
Figure 6:
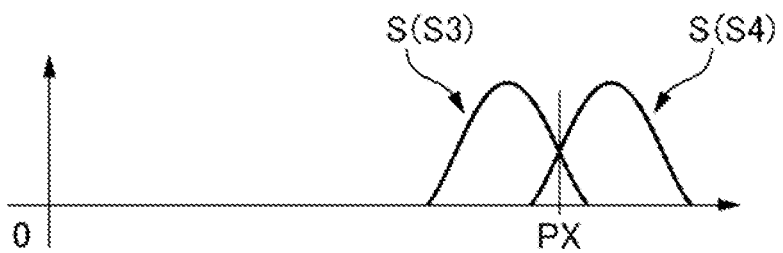
FIG. 6 is a graph illustrating an example of changes in a receiving value of a signal generated in the receiving unit by a third spot and a receiving value of a signal generated in the receiving unit by a fourth spot when a deflection angle of the movable reflection unit in a first direction varies.
Figure 7:
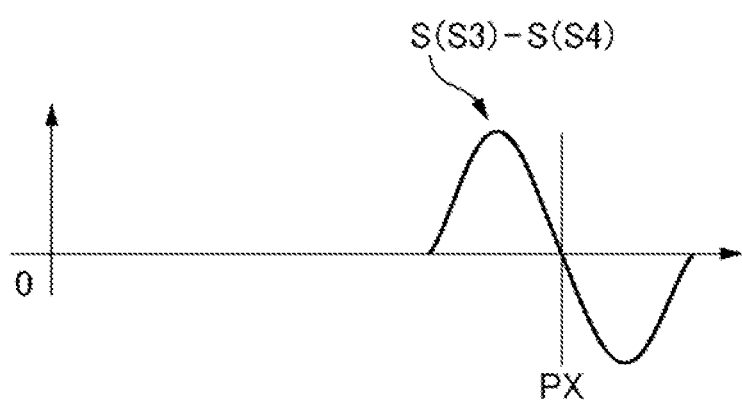
FIG. 7 is a graph illustrating the difference between the two receiving values illustrated in FIG. 6.

FIG. 3 is a graph illustrating an example of signals generated in the receiving unit 130 by the first spot S1 and the second spot S2 that are illustrated in FIG. 2. FIG. 4 is a graph illustrating an example of changes in a receiving value S(S1) of a signal generated in the receiving unit 130 by the first spot S1 and a receiving value S(S2) of a signal generated in the receiving unit 130 by the second spot S2 when the deflection angle of the movable reflection unit 120 in the second direction Y varies. FIG. 5 is a graph illustrating the difference S(S1)–S(S2) between the receiving values S(S1) and S(S2) illustrated in FIG. 4. FIG. 6 is a graph illustrating an example of changes in a receiving value S(S3) of a signal generated in the receiving unit 130 by the third spot S3 and a receiving value S(S4) of a signal generated in the receiving unit 130 by the fourth spot S4 when the deflection angle of the movable reflection unit 120 in the first direction X varies. FIG. 7 is a graph illustrating the difference S(S3)–S(S4) between the two receiving values S(S3) and S(S4) illustrated in FIG. 6.

In FIG. 3, a signal having a peak value a indicates the signal generated by the first spot S1. A signal having a peak value b indicates the signal generated by the second spot S2. A receiving value of a signal generated in the receiving unit 130 by each spot such as the receiving value S(S1), S(S2), S(S3), or S(S4) in FIG. 4 to FIG. 6 is a peak value of the signal generated in the receiving unit 130 by the spot, such as the peak value a or b in FIG. 3.

The horizontal axis of the graph in FIG. 4 indicates the deflection angle of the movable reflection unit 120 in the second direction Y. The vertical axis of the graph in FIG. 4 indicates the intensity of each of the two receiving values S(S1) and S(S2). A solid line labeled "PY" indicates the deflection angle of the movable reflection unit 120 in the second direction Y in the reference state. For example, when the movable reflection unit 120 deflects significantly in the second direction Y in the example illustrated in FIG. 2, the first spot S1 and the second spot S2 move outward, leading to decrease in the area of the first spot S1 projected on the structure 200 and resulting decrease in the receiving value S(S1), and increase in the area of the second spot S2 projected on the structure 200 and resulting increase in the receiving value S(S2). Accordingly, the receiving values S(S1) and S(S2) change in response to the change in the deflection angle of the movable reflection unit 120 in the second direction Y, as illustrated in the graph in FIG. 4.

The horizontal axis of the graph in FIG. 5 indicates the deflection angle of the movable reflection unit 120 in the second direction Y. The vertical axis of the graph in FIG. 5 indicates the difference between the two receiving values S(S1) and S(S2). A solid line labeled "PY" indicates the deflection angle of the movable reflection unit 120 in the second direction Y in the reference state.

The horizontal axis of the graph in FIG. 6 indicates the deflection angle of the movable reflection unit 120 in the first direction X. The vertical axis of the graph in FIG. 6 indicates the intensity of each of the two receiving values S(S3) and S(S4). A solid line labeled "PX" indicates the deflection angle of the movable reflection unit 120 in the first direction X in the reference state. As the value on the horizontal axis increases, the deflection of the movable reflection unit 120 in the first direction X increases. For example, when the movable reflection unit 120 deflects significantly in the first direction X in the example illustrated in FIG. 2, the third spot S3 and the fourth spot S4 move outward, leading to decrease in the area of the third spot S3 projected on the structure 200 and resulting decrease in the receiving value S(S3), and increase in the area of the fourth spot S4 projected on the structure 200 and resulting increase in the receiving value S(S4). Accordingly, the receiving values S(S3) and S(S4) change in response to the change in the deflection angle of the movable reflection unit 120 in the first direction X, as illustrated in the graph in FIG. 6.

The horizontal axis of the graph in FIG. 7 indicates the deflection angle of the movable reflection unit 120 in the first direction X. The vertical axis of the graph in FIG. 7 indicates the difference between the two receiving values S(S3) and S(S4). A solid line labeled "PX" indicates the deflection angle of the movable reflection unit 120 in the first direction X in the reference state.

For example, the difference between the first reference receiving value for the first spot S1 and the second reference receiving value for the second spot S2 may be zero. For example, in FIG. 4 and FIG. 5, the first reference receiving value is the receiving value S(S1) in the reference state, and the second reference receiving value is the receiving value S(S2) in the reference state. In FIG. 5, S(S1)–S(S2) may be set to be zero in the reference state. When the deflection angle of the movable reflection unit 120 in the second direction Y is smaller than the deflection angle of the movable reflection unit 120 in the second direction Y in the reference state, S(S1)–S(S2) is a positive value. In this case, the amendment unit 150 may amend the detection result by the detection unit 122 such that S(S1)–S(S2) returns to zero, in other words, the deflection angle of the movable reflection unit 120 in the second direction Y increases. When the deflection angle of the movable reflection unit 120 in the second direction Y is greater than the deflection angle of the movable reflection unit 120 in the second direction Y in the reference state, S(S1)–S(S2) is a negative value. In this case, the amendment unit 150 may amend the detection result by the detection unit 122 such that S(S1)–S(S2) returns to zero, in other words, the deflection angle of the movable reflection unit 120 in the second direction Y decreases. Accordingly, amendment of the detection result by the amendment unit 150 amends a drive signal of the movable reflection unit 120, and the deflection angle of the movable reflection unit 120 in the second direction Y is kept to the deflection angle in the reference state.

For example, the difference between the first reference receiving value for the third spot S3 and the second reference receiving value for the fourth spot S4 may be zero. For example, in FIG. 6 and FIG. 7, the first reference receiving value is the receiving value S(S3) in the reference state, and the second reference receiving value is the receiving value S(S4) in the reference state. In FIG. 7, S(S3)–S(S4) may be set to be zero in the reference state. When the deflection angle of the movable reflection unit 120 in the first direction X is smaller than the deflection angle of the movable reflection unit 120 in the first direction X in the reference state, S(S3)–S(S4) is a positive value. In this case, the amendment unit 150 may amend the detection result by the detection unit 122 such that S(S3)–S(S4) returns to zero, in other words, the deflection angle of the movable reflection unit 120 in the first direction X increases. When the deflection angle of the movable reflection unit 120 in the first direction X is greater than the deflection angle of the movable reflection unit 120 in the first direction X in the reference state, S(S3)–S(S4) is a negative value. In this case, the amendment unit 150 may amend the detection result by the detection unit 122 such that S(S3)–S(S4) returns to zero, in other words, the deflection angle of the movable reflection unit 120 in the first direction X decreases. Accordingly, amendment of the detection result by the amendment unit 150 amends the drive signal of the movable reflection unit 120, and the deflection angle of the movable reflection unit 120 in the second direction Y is kept to the deflection angle in the reference state.

Figure 8:
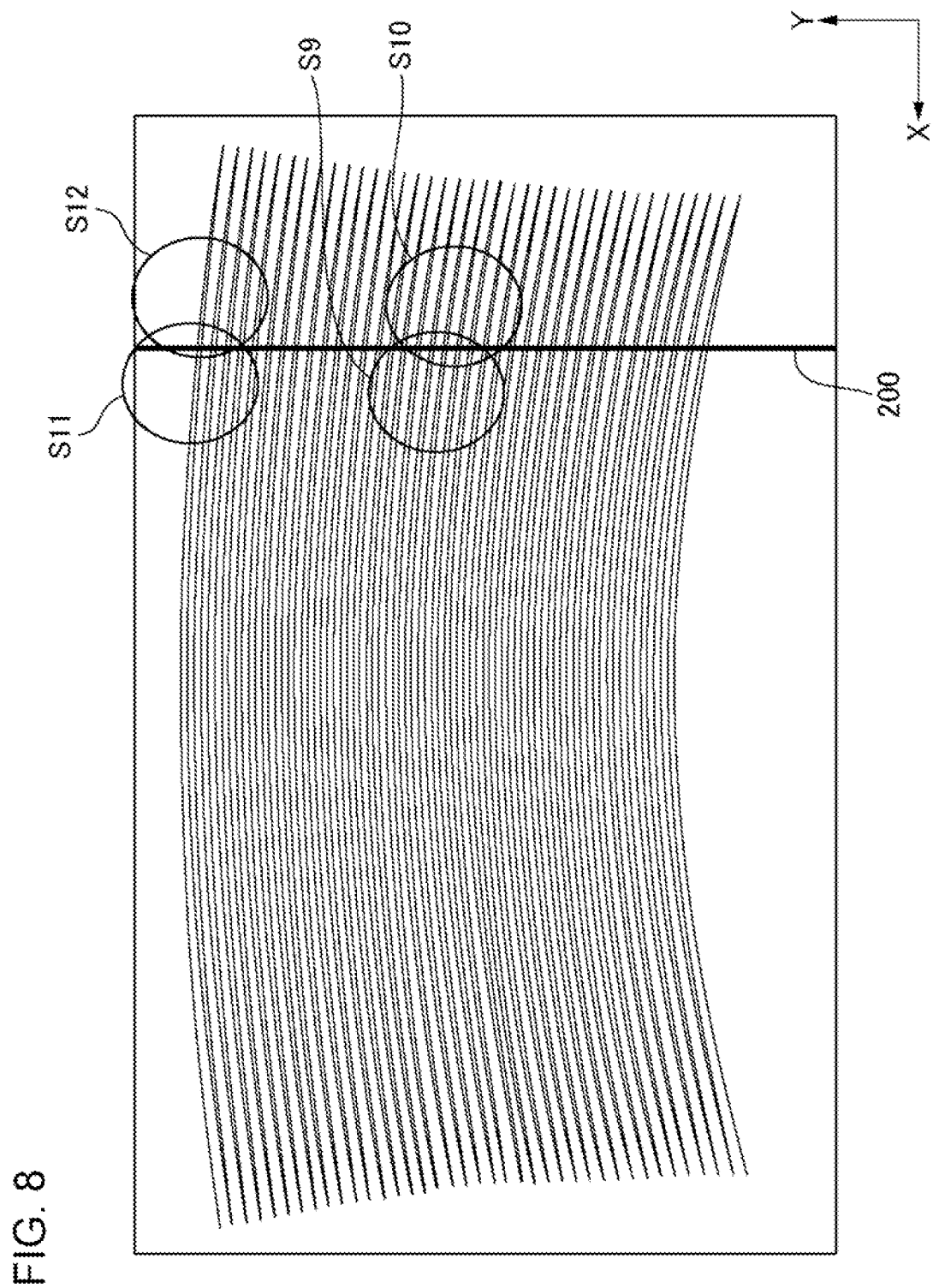
FIG. 8 is a diagram illustrating an example of a relation among a structure, a scanning line of a movable reflection unit, and spots projected on the scanning line in a sensor device according to a modified example.

FIG. 8 is a diagram illustrating an example of a relation among a structure 200, a scanning line L of a movable reflection unit 120, and spots projected on the scanning line L in a sensor device 10 according to a modified example. FIG. 8 is a diagram of a region where the scanning line L is formed, the region being viewed from the movable reflection unit 120 side.

In FIG. 8, a ninth spot S9 and a tenth spot S10 that are arranged roughly at the center of the region in a second direction Y where the scanning line L is formed and along a resonance drive direction of the movable reflection unit 120, that is, a first direction X are indicated by open circles. An eleventh spot S11 and a twelfth spot S12 that are arranged in an upper part of the region in the second direction Y where the scanning line L is formed and along the resonance drive direction of the movable reflection unit 120, that is, the first direction X are indicated by open circles.

The structure 200 intersects the scanning line L of the movable reflection unit 120. Specifically, the structure 200 is a member such as a wire linearly extending along the second direction Y. The width of the structure 200 in the first direction X is narrower than the width of a spot in the first direction X, the spot being generated by the movable reflection unit 120. Accordingly, electromagnetic waves attenuated by the structure 200 can be kept low.

In the example illustrated in FIG. 8, for example, a first part of the structure 200 may be a part of the structure 200 on which the ninth spot S9 is projected. A second part of the structure 200 may be a part of the structure 200 on which the tenth spot S10 is projected. The intensity of a signal generated in a receiving unit 130 by electromagnetic waves reflected by the structure 200, such as a first reference receiving value or a second reference receiving value, varies with a projection area of a spot on the structure 200 and an intensity distribution of the spot.

Figure 9:
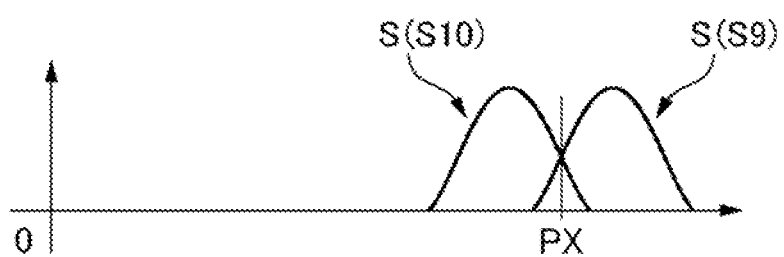
FIG. 9 is a graph illustrating an example of changes in a receiving value of a signal generated in a receiving unit by a ninth spot and a receiving value of a signal generated in the receiving unit by a tenth spot when a deflection angle of the movable reflection unit in a first direction varies.
Figure 10:
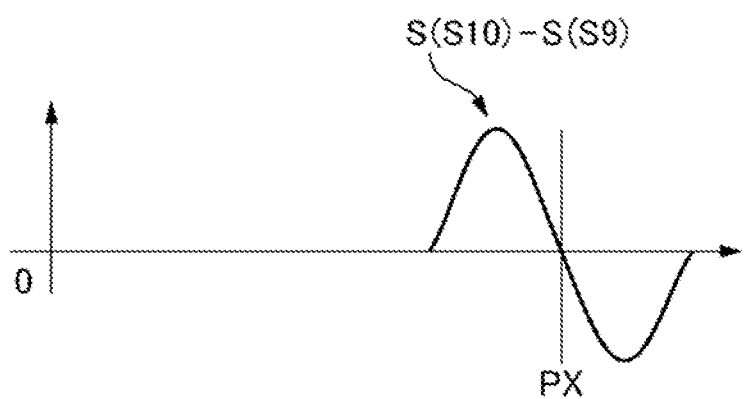
FIG. 10 is a graph illustrating the difference between the two receiving values illustrated in FIG. 9.

FIG. 9 is a graph illustrating an example of changes in a receiving value S(S9) generated in the receiving unit 130 by the ninth spot S9 and a receiving value S(S10) generated in the receiving unit 130 by the tenth spot S10 when a deflection angle of the movable reflection unit 120 in the first direction X varies. FIG. 10 is a graph illustrating the difference between the two receiving values S(S9) and S(S10) illustrated in FIG. 9.

The horizontal axis of the graph in FIG. 9 indicates the deflection angle of the movable reflection unit 120 in the first direction X. The vertical axis of the graph in FIG. 9 indicates the intensity of each of the two receiving values S(S9) and S(S10). A solid line labeled "PX" indicates the deflection angle of the movable reflection unit 120 in the first direction X in a reference state. As the value on the horizontal axis increases, the deflection of the movable reflection unit 120 in the first direction X increases.

The horizontal axis of the graph in FIG. 10 indicates the deflection angle of the movable reflection unit 120 in the second direction Y. The vertical axis of the graph in FIG. 10 indicates the difference S(S10)–S(S9) between the two receiving values S(S9) and S(S10). A solid line labeled "PY" indicates the deflection angle of the movable reflection unit 120 in the second direction Y in the reference state.

Figure 11:
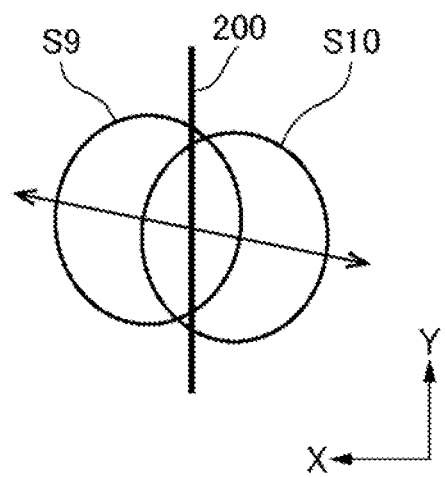
FIG. 11 is a diagram illustrating an example of a relation among the structure, the ninth spot, and the tenth spot in a reference state.
Figure 12:
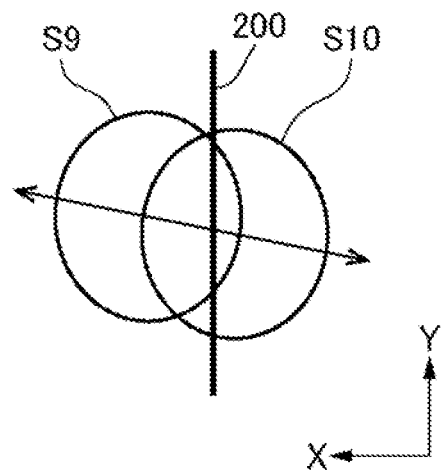
FIG. 12 is a diagram illustrating an example of a relation among the structure, the ninth spot, and the tenth spot when a deflection angle of the movable reflection unit in the first direction is smaller than a deflection angle in the reference state.
Figure 13:
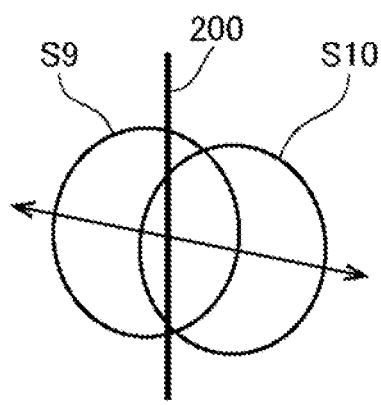
FIG. 13 is a diagram illustrating an example of a relation among the structure, the ninth spot, and the tenth spot when the deflection angle of the movable reflection unit in the first direction is greater than the deflection angle in the reference state.

FIG. 11 is a diagram illustrating an example of a relation among the structure 200, the ninth spot S9, and the tenth spot S10 in the reference state. FIG. 12 is a diagram illustrating an example of a relation among the structure 200, the ninth spot S9, and the tenth spot S10 when the deflection angle of the movable reflection unit 120 in the first direction X is smaller than the deflection angle in the reference state. FIG. 13 is a diagram illustrating an example of a relation among the structure 200, the ninth spot S9, and the tenth spot S10 when the deflection angle of the movable reflection unit 120 in the first direction X is greater than the deflection angle in the reference state. A double-pointed arrow passing through the ninth spot S9 and the tenth spot S10 in FIG. 11 to FIG. 13 indicates a direction of oscillation of the movable reflection unit 120 in the first direction X.

In FIG. 11, the area of the ninth spot S9 projected on the structure 200 is substantially equal to the area of the tenth spot S10 projected on the structure 200. Accordingly, S(S10)−S(S9) in the reference is zero, as illustrated in FIG. 10.

In FIG. 12, the area of the tenth spot S10 projected on the structure 200 is greater than the area of the ninth spot S9 projected on the structure 200. Accordingly, S(S10)−S(S9) illustrated in FIG. 10 is a positive value, and the deflection angle of the movable reflection unit 120 in the first direction X being smaller than the deflection angle in the reference state can be detected.

In FIG. 13, the area of the tenth spot S10 projected on the structure 200 is smaller than the area of the ninth spot S9 projected on the structure 200. Accordingly, S(S10)−S(S9) illustrated in FIG. 10 is a negative value, and the deflection angle of the movable reflection unit 120 in the first direction X being greater than the deflection angle in the reference state can be detected.

For example, the difference between the first reference receiving value for the ninth spot S9 and the second reference receiving value for the tenth spot S10 may be zero. For example, in FIG. 9 and in FIG. 10, the first reference receiving value is the receiving value S(S9) in the reference state, and the second reference receiving value is the receiving value S(S10) in the reference state. In FIG. 10, S(S10)−S(S9) may be set to be zero in the reference state. When the deflection angle of the movable reflection unit 120 in the second direction Y varies from the deflection angle of the movable reflection unit 120 in the second direction Y in the reference state, and S(S10)−S(S9) is a positive or negative value, the amendment unit 150 may amend a detection result by a detection unit 122 such that S(S10)−S(S9) returns to zero.

An example of using the ninth spot S9 and the tenth spot S10 has been described in FIG. 9 to FIG. 13. However, use of the eleventh spot S11 and the twelfth spot S12 may be the same as the example described by using FIG. 9 to FIG. 13.

Figure 14:
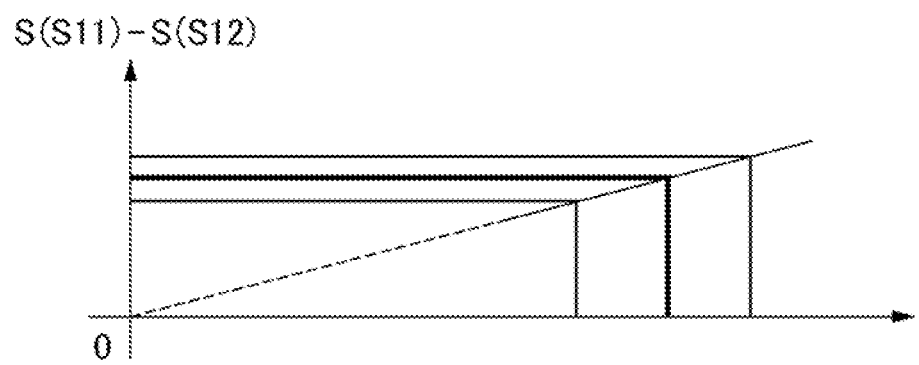
FIG. 14 is a graph illustrating an example of a relation between a deflection angle of the movable reflection unit in a second direction, and the difference between a receiving value of a signal generated in the receiving unit by an eleventh spot and a receiving value of a signal generated in the receiving unit by a twelfth spot.

FIG. 14 is a graph illustrating an example of a relation between the deflection angle of the movable reflection unit 120 in the second direction Y and the difference S(S11)−S(S12) between a receiving value S(S11) of a signal generated in the receiving unit 130 by the eleventh spot S11 and a receiving value S(S12) of a signal generated in the receiving unit 130 by the twelfth spot S12.

In FIG. 14, the horizontal axis of the graph indicates the deflection angle of the movable reflection unit 120 in the second direction Y. The vertical axis of the graph indicates the difference S(S11)−S(S12) between the receiving value S(S11) of the signal generated in the receiving unit 130 by the eleventh spot S11 and the receiving value S(S12) of the signal generated in the receiving unit 130 by the twelfth spot S12.

Figure 15:
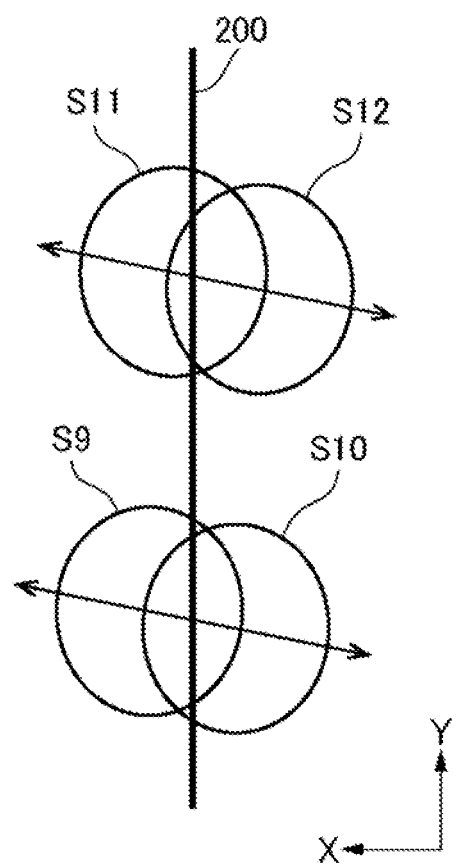
FIG. 15 is a diagram illustrating an example of a relation among the structure, the ninth spot, the tenth spot, the eleventh spot, and the twelfth spot in the reference state.
Figure 16:
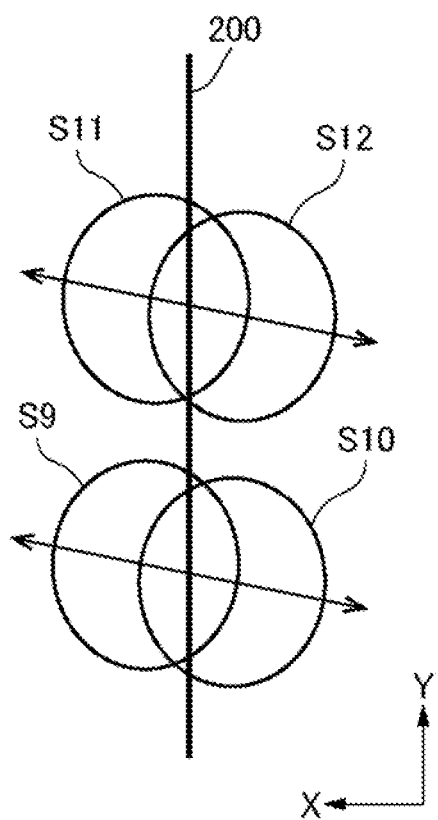
FIG. 16 is a diagram illustrating an example of a relation among the structure, the ninth spot, the tenth spot, the eleventh spot, and the twelfth spot when the deflection angle of the movable reflection unit in the second direction is smaller than the deflection angle in the reference state.
Figure 17:
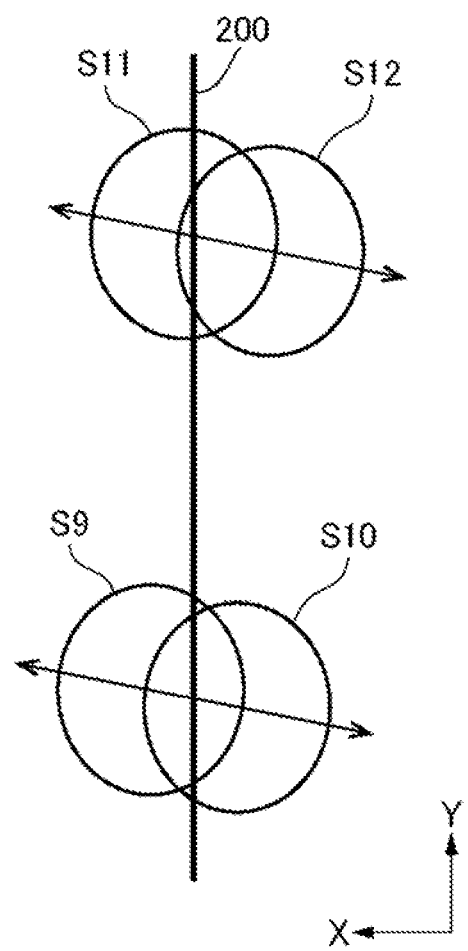
FIG. 17 is a diagram illustrating an example of a relation among the structure, the ninth spot, the tenth spot, the eleventh spot, and the twelfth spot when the deflection angle of the movable reflection unit in the first direction is greater than the deflection angle in the reference state.

FIG. 15 is a diagram illustrating an example of a relation among the structure 200 in the reference state, the ninth spot S9, the tenth spot S10, the eleventh spot S11, and the twelfth spot S12. FIG. 16 is a diagram illustrating an example of a relation among the structure 200, the ninth spot S9, the tenth spot S10, the eleventh spot S11, and the twelfth spot S12 when the deflection angle of the movable reflection unit 120 in the second direction Y is smaller than the deflection angle in the reference state. FIG. 17 is a diagram illustrating an example of a relation among the structure 200, the ninth spot S9, the tenth spot S10, the eleventh spot S11, and the twelfth spot S12 when the deflection angle of the movable reflection unit 120 in the first direction X is greater than the deflection angle in the reference state. In FIG. 15 to FIG. 17, each of a double-pointed arrow passing through the ninth spot S9 and the tenth spot S10, and a double-pointed arrow passing through the eleventh spot S11 and the twelfth spot S12 indicates a direction of oscillation of the movable reflection unit 120 in the first direction X.

In FIG. 15 to FIG. 17, the area of the ninth spot S9 projected on the structure 200 is substantially equal to the area of the tenth spot S10 projected on the structure 200.

The difference between the area of the eleventh spot S11 projected on the structure 200 and the area of the twelfth spot S12 projected on the structure 200 in FIG. 16 is smaller than the difference between the area of the eleventh spot S11 projected on the structure 200 and the area of the twelfth spot S12 projected on the structure 200 in FIG. 15. Accordingly, as illustrated in FIG. 14, the difference S(S11)−S(S12) when the deflection angle of the movable reflection unit 120 in the second direction Y is smaller than the deflection angle in the reference state is smaller than the difference S(S11)−S(S12) in the reference state. In this case, the amendment unit 150 may amend the detection result by the detection unit 122 such that that the difference S(S11)−S(S12) returns to the difference S(S11)−S(S12) in the reference state.

The difference between the area of the eleventh spot S11 projected on the structure 200 and the area of the twelfth spot S12 projected on the structure 200 in FIG. 17 is greater than the difference between the area of the eleventh spot S11 projected on the structure 200 and the area of the twelfth spot S12 projected on the structure 200 in FIG. 15. Accordingly, as illustrated in FIG. 14, the difference S(S11)−S(S12) when the deflection angle of the movable reflection unit 120 in the second direction Y is greater than the deflection angle in the reference state is greater than the difference S(S11)−S(S12) in the reference state. In this case, the amendment unit 150 may amend the detection result by the detection unit 122 such that the difference S(S11)−S(S12) returns to the difference S(S11)−S(S12) in the reference state.

While the embodiment and the modified example have been described above with reference to the drawings, the embodiment and the modified example are exemplifications of the present invention, and various configurations other than those described above may be employed.

For example, the sensor device 10 according to the embodiment is a coaxial LiDAR. However, the sensor device 10 may be a biaxial LiDAR.

This application claims priority based on Japanese Patent Application No. 2020-062799, filed on Mar. 31, 2020, the disclosure of which is hereby incorporated by reference thereto in its entirety.

REFERENCE SIGNS LIST

10 Sensor device
110 Emission unit

120 Movable reflection unit
122 Detection unit
130 Receiving unit
140 Beam splitter
150 Amendment unit
162 First adjustment unit
164 Second adjustment unit
200 Structure
L Scanning line
S1 First spot
S2 Second spot
S3 Third spot
S4 Fourth spot
S5 Fifth spot
S6 Sixth spot
S7 Seventh spot
S8 Eighth spot
S9 Ninth spot
S10 Tenth spot
S11 Eleventh spot
S12 Twelfth spot
X First direction
Y Second direction

The invention claimed is:

1. A sensor device comprising:
a movable reflection unit reflecting an electromagnetic wave toward inside a predetermined scanning range;
a detection unit detecting a deflection angle of the movable reflection unit;
a receiving unit receiving the electromagnetic wave reflected or scattered by a structure in which partially is positioned in the scanning range; and
an amendment unit amending a detection result by the detection unit, based on a receiving result of the electromagnetic wave by the receiving unit, the electromagnetic wave being reflected by the structure,
wherein the amendment unit amends the detection result by the detection unit, based on a relation between a first receiving value of the electromagnetic wave by the receiving unit, the electromagnetic wave being reflected or scattered by a first part of the structure, and a second receiving value of the electromagnetic wave by the receiving unit, the electromagnetic wave being reflected or scattered by a second part of the structure.

2. The sensor device according to claim 1, wherein
the amendment unit amends the detection result by the detection unit, based on a comparison result between the relation between the first receiving value and the second receiving value, and a relation between a first reference receiving value of the electromagnetic wave by the receiving unit, the electromagnetic wave being reflected or scattered by the first part of the structure, when the detection unit operates in a reference state and a second reference receiving value of the electromagnetic wave by the receiving unit, the electromagnetic wave being reflected or scattered by the second part of the structure, when the detection unit operates in the reference state.

3. The sensor device according to claim 2, further comprising
a first adjustment unit adjusting a position of the structure such that the relation between the first reference receiving value and the second reference receiving value is a predetermined reference relation.

4. The sensor device according to claim 2, wherein
the movable reflection unit reflects, toward inside the scanning range, the electromagnetic wave emitted from an emission unit, and
the sensor device further comprises a second adjustment unit adjusting an emission timing of the electromagnetic wave from the emission unit such that the relation between the first reference receiving value and the second reference receiving value is a predetermined reference relation.

5. The sensor device according to claim 1, wherein
the first part and the second part of the structure deviate in a linear drive direction of the movable reflection unit.

6. The sensor device according to claim 1, wherein
the first part and the second part of the structure deviate in a resonance drive direction of the movable reflection unit.

7. The sensor device according to claim 1, wherein
the structure is positioned outside a region where a scanning line of the movable reflection unit is formed.

8. The sensor device according to claim 1, wherein
the structure intersects a scanning line of the movable reflection unit.

* * * * *